(12) United States Patent
Alecci

(10) Patent No.: US 7,055,256 B2
(45) Date of Patent: Jun. 6, 2006

(54) PLUMB BOB SQUARE BRACKET

(76) Inventor: LaVern Alecci, 402 E. Main St., Galatia, IL (US) 62935

( * ) Notice: Subject to any disclaimer, the term of this patent is extended or adjusted under 35 U.S.C. 154(b) by 0 days.

(21) Appl. No.: 10/791,741

(22) Filed: Mar. 4, 2004

(65) Prior Publication Data

US 2005/0193580 A1 Sep. 8, 2005

(51) Int. Cl.
*G01C 15/10* (2006.01)
*B43L 13/00* (2006.01)

(52) U.S. Cl. .......................... 33/392; 33/404

(58) Field of Classification Search .......... 33/391–392, 33/194, 404, 407–410, 429, 474, 481, 286; 248/220.1
See application file for complete search history.

(56) References Cited

U.S. PATENT DOCUMENTS

| | | | | |
|---|---|---|---|---|
| 233,618 A | | 10/1880 | Herzog | |
| 885,076 A | | 4/1908 | Olson | |
| 1,032,594 A | * | 7/1912 | Ferguson | 33/480 |
| 1,838,607 A | * | 12/1931 | Emil | 33/429 |
| 2,503,098 A | * | 4/1950 | Crocker | 33/410 |
| 2,794,263 A | * | 6/1957 | Cranmer | 33/347 |
| 4,266,347 A | * | 5/1981 | Illgen | 33/393 |
| D263,032 S | * | 2/1982 | Amos | D10/70 |
| 4,442,610 A | * | 4/1984 | Owens, Jr. | 33/392 |
| 4,617,820 A | | 10/1986 | Hammond | |
| 5,136,785 A | * | 8/1992 | Shirley | 33/404 |
| 5,274,929 A | * | 1/1994 | Tocci | 33/407 |
| 5,419,054 A | | 5/1995 | Stoneberg | |
| 5,473,819 A | * | 12/1995 | Byers et al. | 33/339 |
| 5,481,809 A | * | 1/1996 | Rooney | 33/392 |
| D366,994 S | * | 2/1996 | Byers et al. | D8/14 |
| 5,771,597 A | * | 6/1998 | Hopf | 33/474 |
| 5,855,073 A | * | 1/1999 | Boelling | 33/533 |
| 5,897,816 A | * | 4/1999 | Johnson | 33/404 |
| 5,933,974 A | * | 8/1999 | Walters et al. | 33/474 |
| D423,957 S | | 5/2000 | Johnson | |
| 6,374,504 B1 | * | 4/2002 | Graham | 33/464 |
| 6,430,826 B1 | * | 8/2002 | Sigl | 33/408 |
| D465,424 S | | 11/2002 | Allemand | |
| 6,578,278 B1 | * | 6/2003 | Siefert | 33/429 |
| 6,729,033 B1 | * | 5/2004 | Jevons et al. | 33/481 |

* cited by examiner

*Primary Examiner*—Yaritza Guadalupe
(74) *Attorney, Agent, or Firm*—Dennison, Schultz, Dougherty & MacDonald

(57) ABSTRACT

A plumb bob bracket is disclosed for use in building construction having a first stud wall and a second stud wall each having an upper beam, a lower beam, and a plurality of vertical beams therebetween. The plumb bob bracket includes a first leg, a second leg attached to the first leg at an angle, a plumb bob attached to the plumb bob bracket by a string, wherein the first leg comprises a first flat panel and a second flat plat panel attached to the first flat panel at a right angle, and a bar member attached to the first flat panel at one end and the third flat panel at a second end.

7 Claims, 3 Drawing Sheets

PLUMB BOB SQUARE BRACKET

TECHNICAL FIELD

The present invention is directed toward a construction apparatus, and more particularly, toward a bracket for squaring adjacent stud walls and plumbing thereof.

BACKGROUND OF THE INVENTION

Plumb bobs have been well known and used as a necessary tool in building constructions. Other tools of the trade, for example, hand held squares are also known.

However, one problem with either of these individual tools is that during the construction they do not hold the stud wall sections plumbed and squared relative to one another throughout the construction.

It is therefore a primary object of the present invention to provide a plumb bob square bracket that plumbs the adjoining stud walls and keeps the stud walls square relative to one another throughout the construction.

It is another object of the invention to provide a plumb bob square bracket that has sufficient structural rigidity to hold the wall sections together and it is easily assembled and removed at the construction site.

SUMMARY OF THE INVENTION

These problems and others are addressed by the present invention which comprises a plumb bob bracket for use in building construction having a first stud wall and a second stud wall each having an upper beam, a lower beam, and a plurality of vertical beams therebetween. The plumb bob bracket includes a first leg, a second leg attached to the first leg at an angle, a plumb bob attached to the plumb bob bracket by a string, wherein the first leg comprises a first flat panel and a second flat plat panel attached to the first flat panel at a right angle, and a bar member attached to the first flat panel at one end and the third flat panel at a second end.

BRIEF DESCRIPTION OF DRAWINGS

These and other objects of the present invention will be appreciated and understood by those skilled in the art from the detailed description of the preferred embodiments of the invention and the following drawings of which.

DETAILED DESCRIPTION OF THE INVENTION

Figure 1:
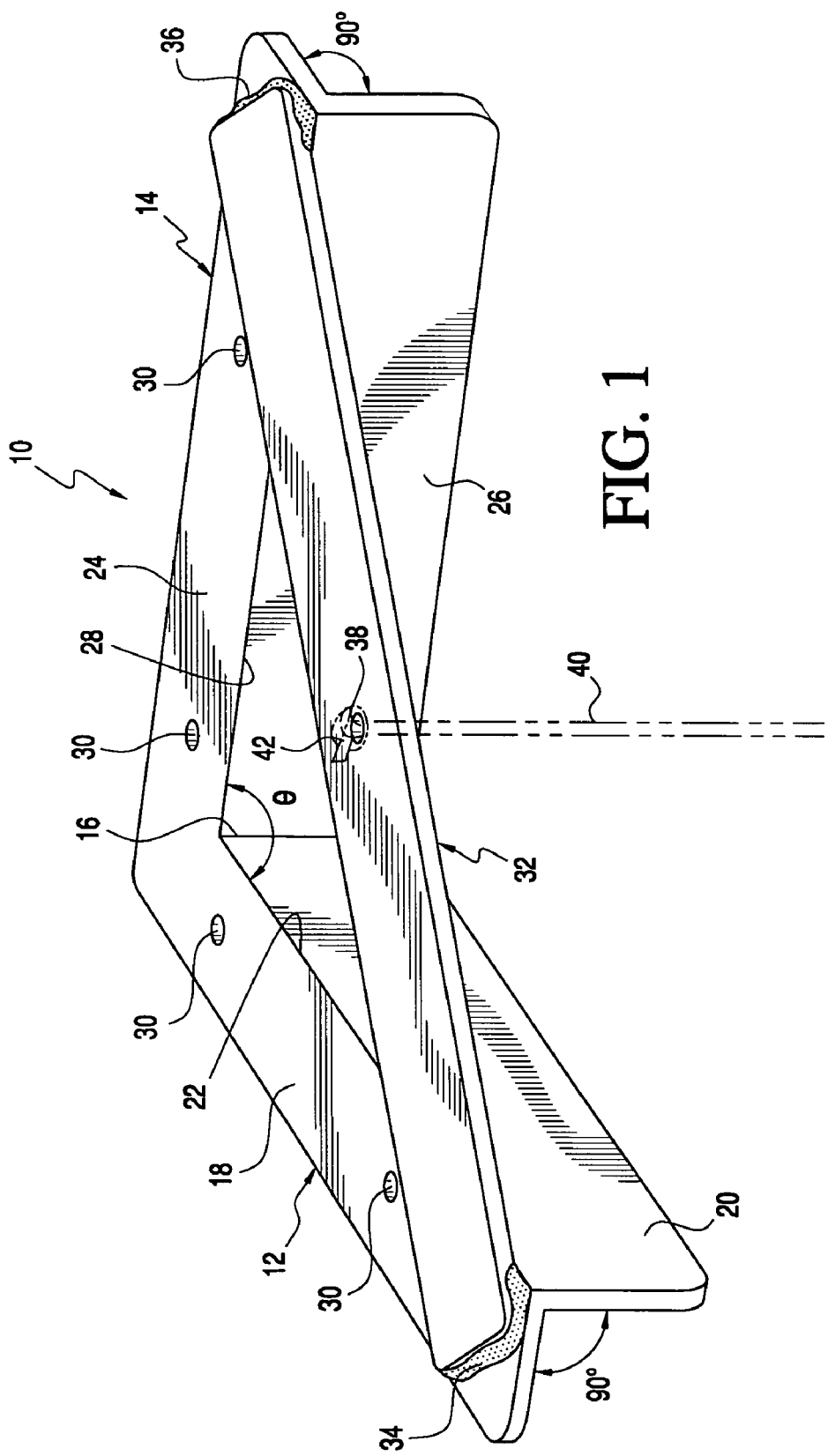
FIG. 1 is a perspective view of the preferred embodiment of the plumb bob bracket.

Referring now to the drawings, wherein the showings are for the purpose of illustrating the preferred embodiment of the invention only and not for the purpose of limiting the same, a plumb bob bracket 10 is shown. In the first representative embodiment of the present invention, the plumb bob bracket 10 includes a first leg 12 and a second leg 14 connected to one another along a common edge 16 at an angle θ. It is also contemplated that the first leg 12 and the second leg 14 may be an integral piece and manufactured as one piece. In the first representative embodiment of the present invention, θ is equal to 90°, however, other embodiments of the plumb bob bracket may have the θ to be at 22 ½, 30°, 45°, or any other desired angles. It is also noted that the plumb bob bracket 10 is manufactured preferably of ³⁄₁₆" steel to provide sufficient structural integrity for housing constructions.

Moreover, the first leg 12 further includes a first substantially flat panel 18 and a second substantially flat panel 20 joined together along an edge 22, or in the alternative, manufactured as integrally as one piece, at an angle equal to 90°. Similarly, the second leg 14 also includes a third substantially flat panel 24 and a fourth substantially flat panel 26 joined together along an edge 28, or in the alternative, manufactured integrally as on piece, at an angle equal to 90 degrees. The first and the third flat panels, 18, 24, each comprises a plurality of apertures or bores 30 for, as will be explained herein in greater detail, for securing the plumb bob bracket 10 to the wall sections.

Figure 2:
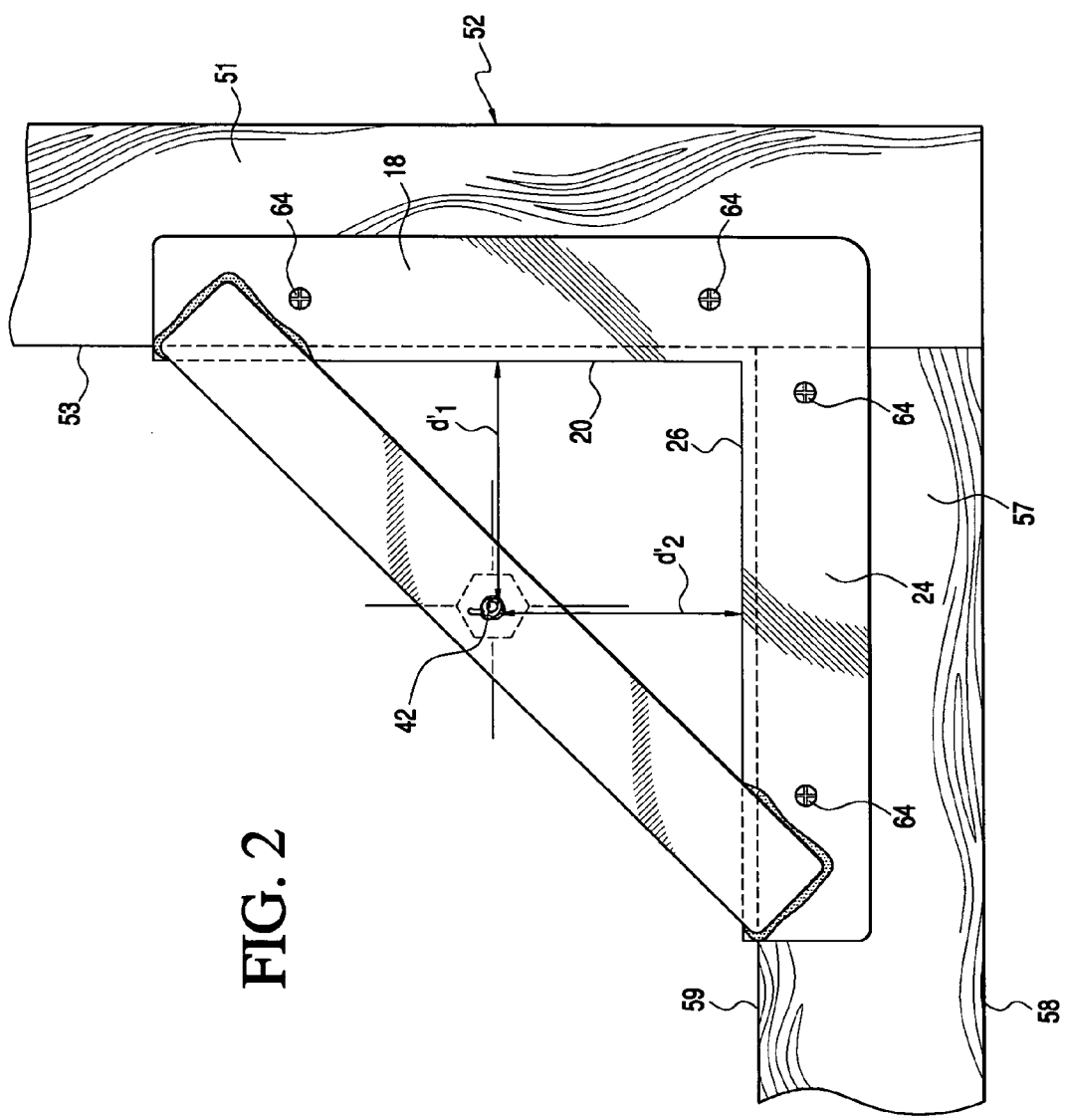
FIG. 2 is a top plan view of the plumb bob bracket of FIG. 1 in a mounted configuration.

Referring now to FIGS. 1 and 2, the plumb bob bracket 10 further includes a bar member 32 having a first end 34 and a second end 36, wherein the first end 34 is attached to the upper surface of the first flat panel 18 by welding or other suitable means, and wherein the second end 36 is attached to the upper surface of the third flat panel 24 by also welding or other suitable means. Therefore, the first representative embodiment of the plumb bob bracket 10, as best seen in FIGS. 1 and 2, has a generally triangular configuration. The bar member 32 also includes an aperture 38 disposed at preferably a midpoint length of the bar member 32.

The plumb bob bracket 10 further includes a string 40 having a first end 42 secured and knotted through the aperture 38, and a second end 44 attached to a plumb bob 46. As will be explained herein in greater detail, the string 40 may be of a desired length that will extend substantially close to the floor once the plumb bob bracket 10 is mounted, as shown in FIG. 3, or, in the alternative, the plum bob 46 may include a laser beam producing device 47 wherein the length of the string 40 may be substantially shorter because the laser beam producing device produces a beam projected at substantial distance.

Figure 3:
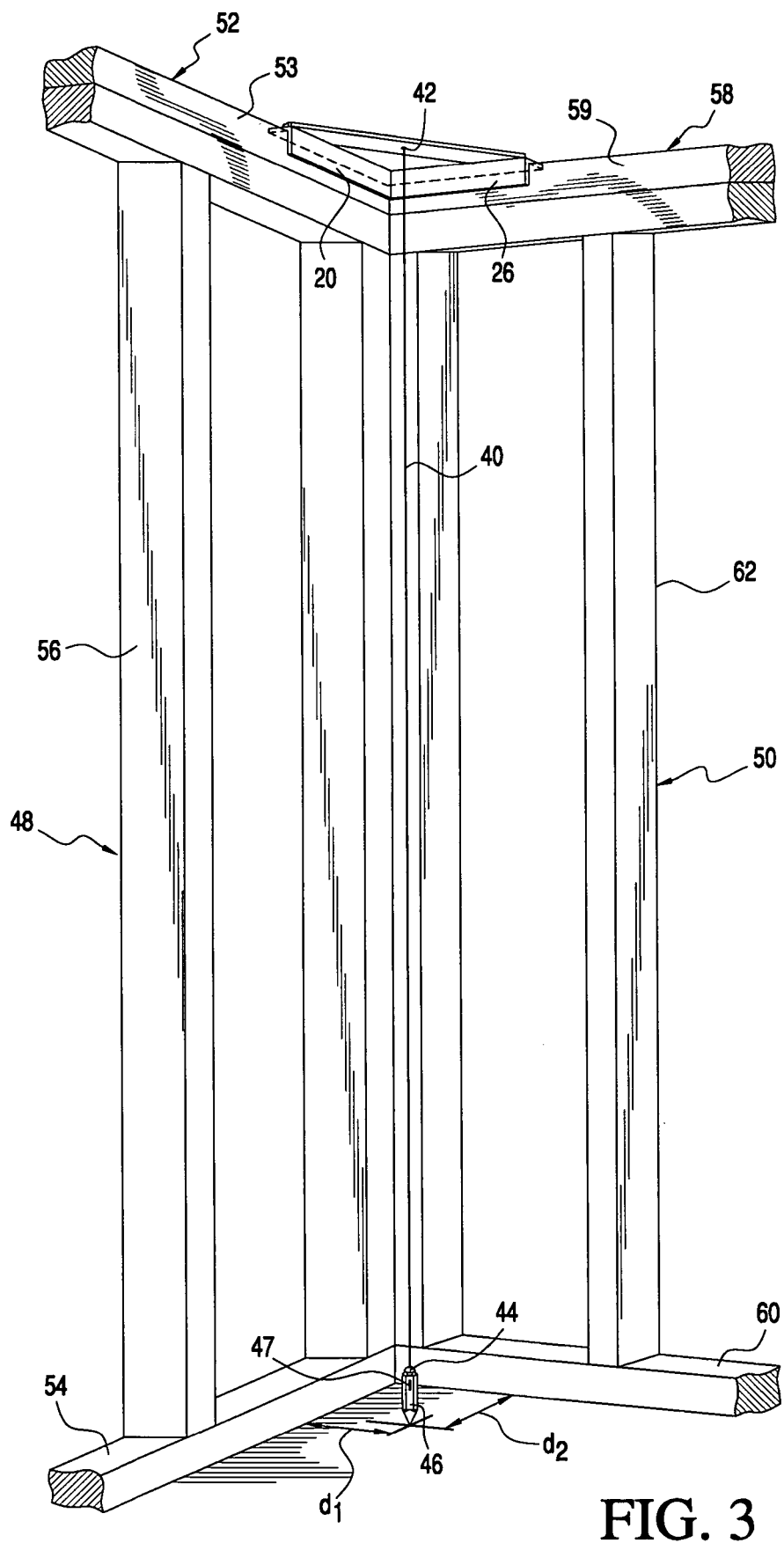
FIG. 3 is a perspective view of the mounted plumb bob bracket of FIG. 2 mounted on a wall section.

Referring now to FIGS. 2 and 3, the plumb bob bracket 10 is shown in a mounted and use configuration in a typical stud wall construction. As indicated above, the first representative embodiment of the plumb bob bracket 10 is used for being secured to adjoining first and second stud walls 48, 50, that are cornered at a 90° angle. Broadly, the first stud wall 48 includes an upper beam 52, a lower beam 54, and a plurality of vertical beams 56 connected between the upper beam 52 and the lower beam 54. The upper beam 52 includes a top surface 51 and side surface 53 perpendicular to the top surface 51. Similarly, the second stud wall 50 includes an upper beam 58, a lower beam 60, and a plurality of vertical beams 62 connected between the upper beams 58 and the lower beam 60. The upper beam 58 includes a top surface 57 and a side surface 59 perpendicular to the top surface 57.

The plumb bob bracket 10 is removably attached to the first and the second stud walls 48, 50, to ensure the stud walls 48, 50 remain attached to one another at the desired angle θ throughout the construction, that is, at a 90° angle relative to one another in the first representative embodiment of the present invention. More specifically, the second flat panel 20 of the first leg 12 is flush against the side surface 53 of the upper beam 52, the first flat panel 18 of the first leg 12 is flush against the top surface 51 of the upper beam 52, the fourth flat panel 26 of the second leg 14 flush against the side surface 59 of the upper beam, and the third flat panel 24 of the second leg 14 flush against the top surface 57 of the upper beam 58 so that the edge 22 is collinear with the common edge along the top surface 51 and the side surface 53 of the upper beam, and the edge 28 is collinear with the common edge along the top surface 57 and the side surface 59 of the upper beam 58. Once the plumb bob bracket 10 is in position, a plurality of fasteners 64, such as, but not limited to, screws or nails, are inserted through the apertures 30 to secure the first leg 12 to upper beam 52 and the second leg 14 to the upper beam 58. As stated hereinbefore, this kind of securement and the structural rigidity of the plumb bob bracket ensures that the first and the second stud walls 48, 50, remain squared throughout the construction, after the completion of which, the plumb bob bracket may be removed.

Moreover, not only the plumb bob bracket 10 ensures the first and the second stud walls 48, 50, are squared, but ensures that the walls are also plumbed as will be explained. As best seen in FIG. 2, the distance $d_1'$ from the second flat panel 20 to the aperture 38 is known, the distance $d_2'$ from the fourth flat panel 26 is known. In order to plumb the first and the second stud walls 48, 50, a cross-hair is drawn on the floor at a distance $d_1$ from the lower beam 54, and a distance $d_2$ from the lower beam 60, so that the distance $d_1$ is equal to the distance $d_1'$ and the distance $d_2$ is equal to the distance $d_2'$. Once the plumb bob bracket 10 is attached to the stud walls, the plumb bob 46 should be pointed directed on top of the cross-hair ensuring that the stud walls are plumbed.

While preferred embodiments of the invention have been shown and described, various modifications and substitutions may be made thereto without departing from the spirit and scope of the invention. Accordingly, it is to be understood that the present invention has been described by way of illustration only, and this description should not be construed as limiting to the several claims appended hereto.

What is claimed is:

1. A plumb bob bracket, comprising:
   a first leg having a first panel and a second panel attached to said first panel along common edge and defining a space therebetween;
   a second leg having a first panel and a second panel attached to said first panel along a common edge and defining a space therebetween;
   said first leg having a first end, said second leg having a first end, wherein said first leg first end is attached to said second leg first end at an angle;
   a bar member having a first end aligned and attached to said first panel of said first leg and a second end aligned and attached to said first panel of said second leg;
   a string having a first end and a second end, said second end is attached to said bar member of said plumb bob bracket, and a plumb bob is attached to said first end;
   wherein said plumb bob bracket is removably attached to adjoining first and second beams of a stud wall in a manner that said first beam is positioned within said space between said first and second panels of said first leg, and said second beam is positioned within said first and second panels of said second leg, and said bar member remains a substantially horizontal position.

2. The plumb bob bracket of claim 1, wherein said angle is 90 degrees.

3. The plumb bob bracket of claim 1, wherein said angle is 45 degrees.

4. The plumb bob bracket of claim 1, wherein said plum bob further comprises a laser beam producing means.

5. The plumb bob bracket of claim 1, wherein said first leg first panel is attached to said first leg second panel at a right angle.

6. The plumb bob bracket of claim 1, wherein said second leg first panel is attached to said second leg second panel at a right angle.

7. In combination with a first stud wall and a second stud wall each having an upper beam, a lower beam, and a plurality of vertical beams therebetween, a plumb bob bracket, comprising:
   a first leg having a first panel and a second panel attached to said first panel along a common edge and defining a space therebetween;
   a second leg having a first panel and a second panel attached said first panel along a common edge and defining a space therebetween;
   said first leg having a first end, said second leg having a first end, wherein said first leg first end is attached to said second leg first end at an angle;
   a bar member having a first end aligned and attached to said first panel of said first leg and a second end aligned and attached to said first panel of said second leg;
   wherein said plumb bob bracket is attached to said first stud wall upper beam in a manner that said first stud wall upper beam is positioned within said space between said first and second panels of said first leg, and said second stud wall upper beam with said first and second panels of said second leg.

* * * * *